July 25, 1967 J. C. MICHALOWICZ 3,332,283
FLUID METERING SYSTEM AND APPARATUS
Filed Feb. 11, 1965 4 Sheets-Sheet 4
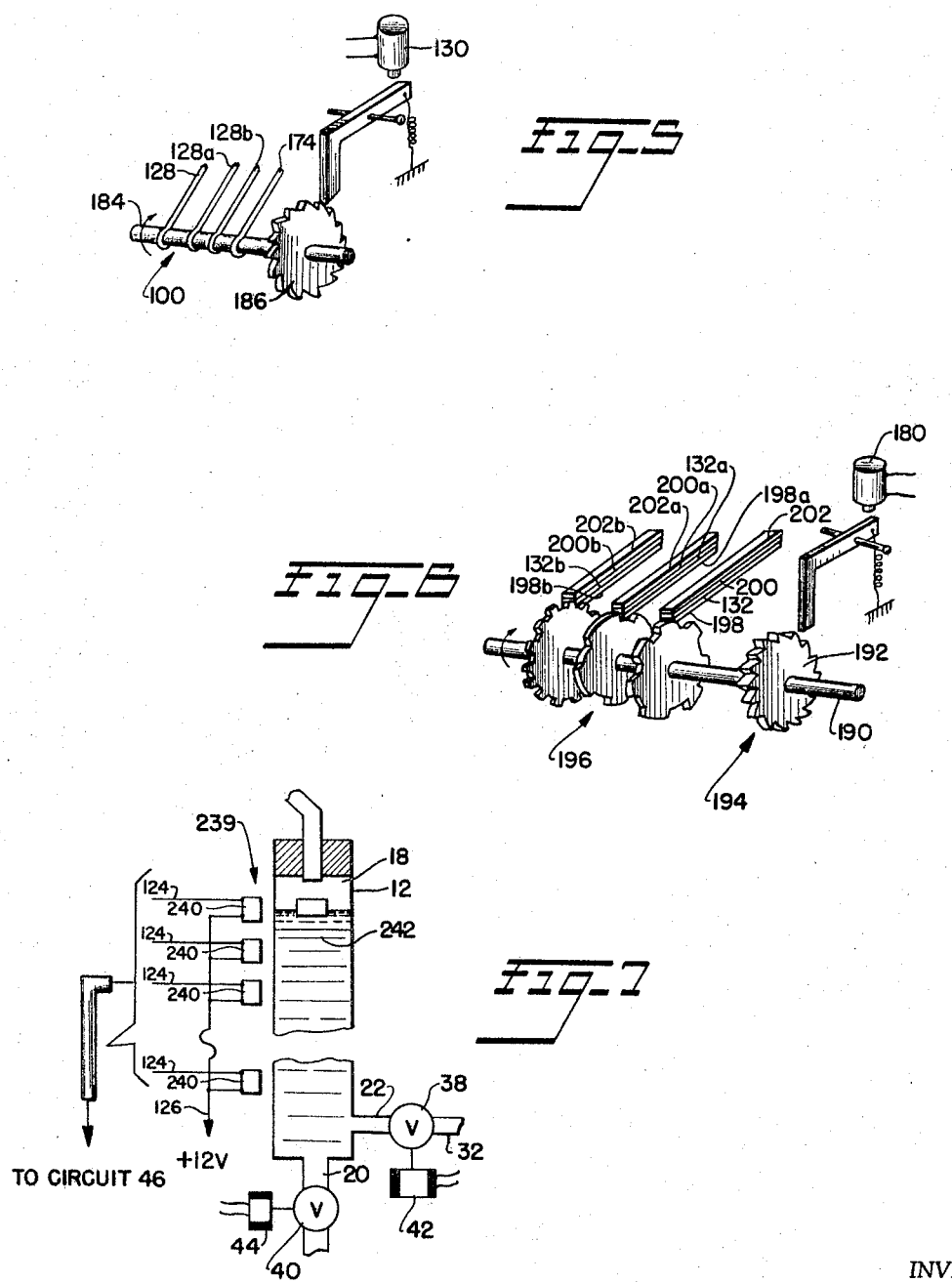
INVENTOR
JOSEPH C. MICHALOWICZ
BY Strauch, Nolan & Neale
ATTORNEYS

United States Patent Office 3,332,283
Patented July 25, 1967

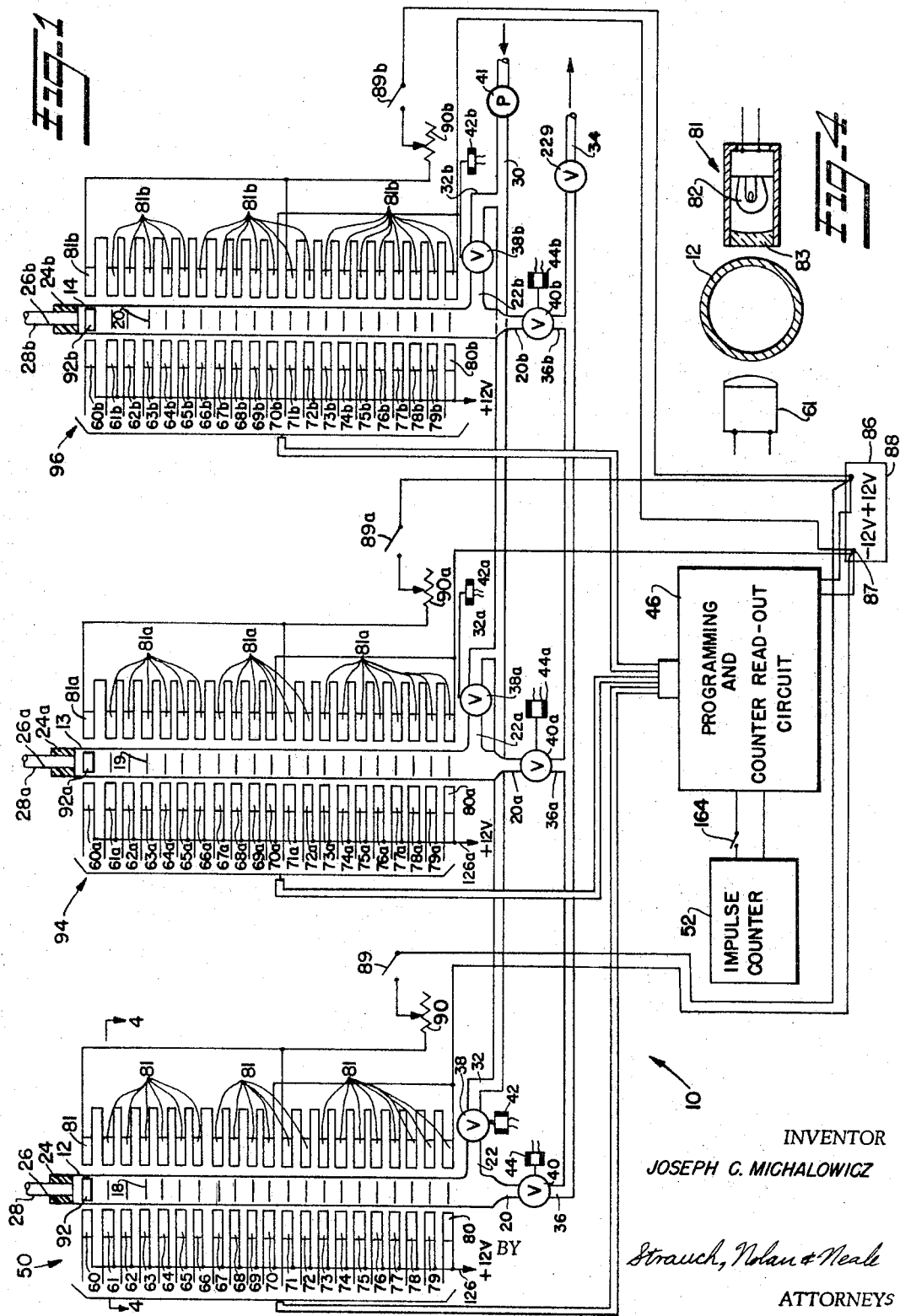

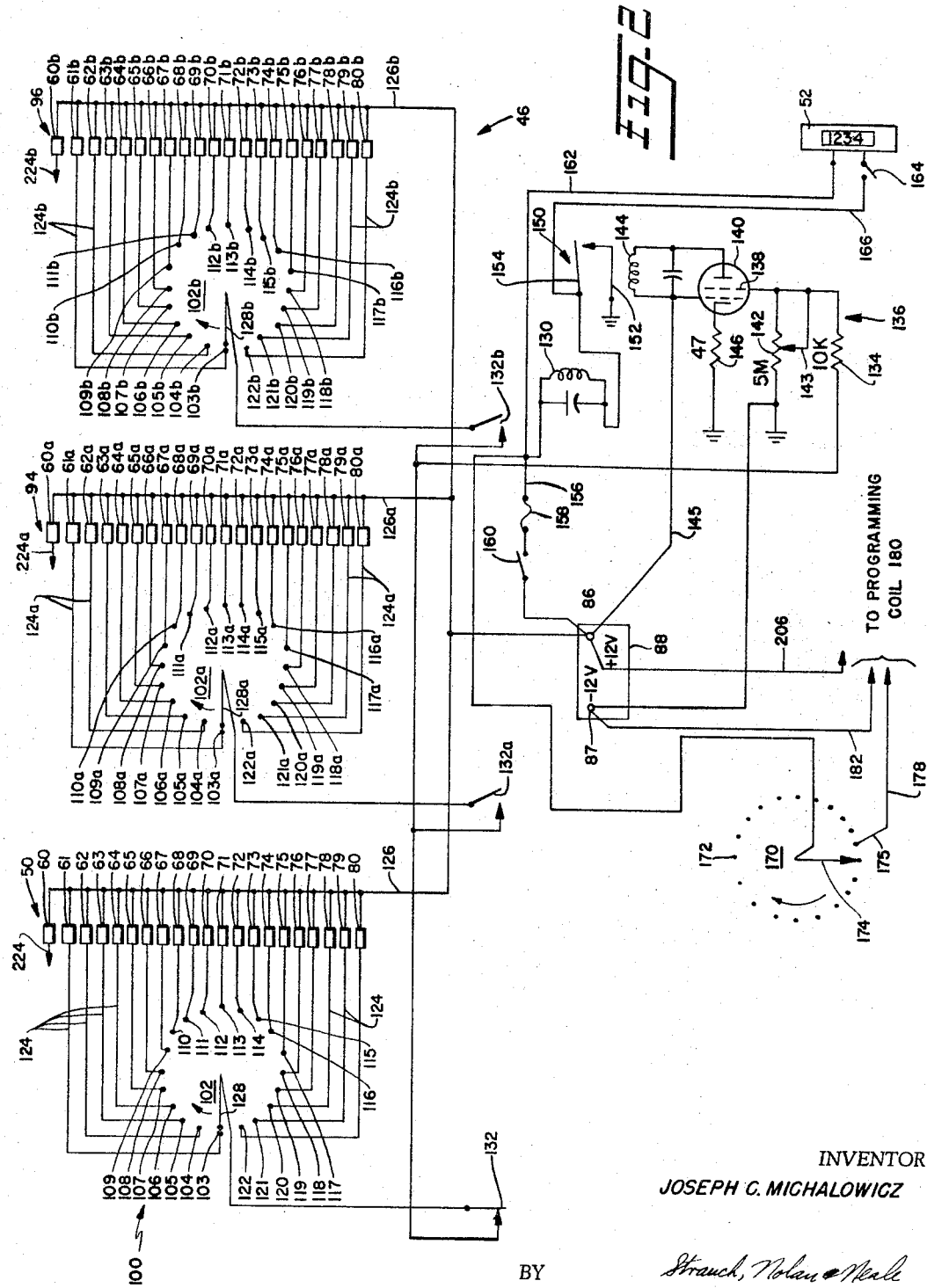

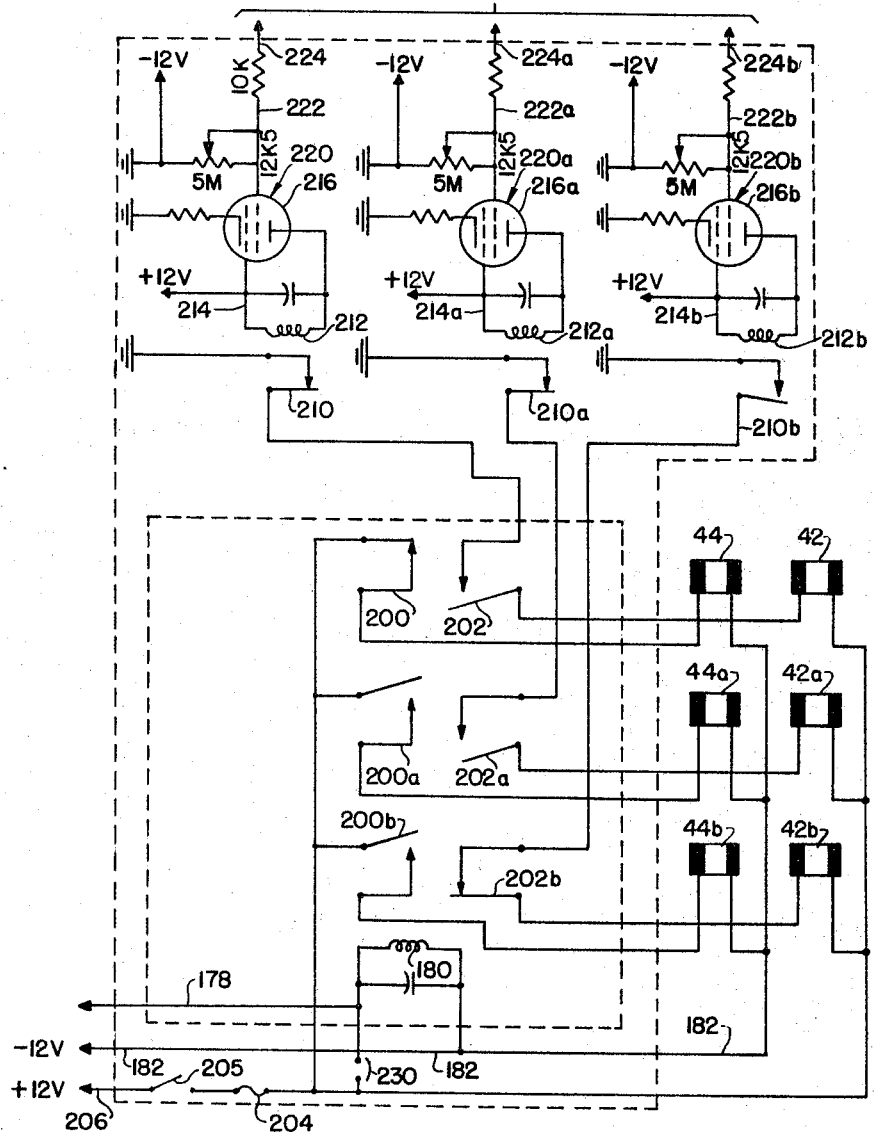

3,332,283
FLUID METERING SYSTEM AND APPARATUS
Joseph Casimir Michalowicz, 7409 Wyndale Road,
Chevy Chase, Md. 20015
Filed Feb. 11, 1965, Ser. No. 431,798
8 Claims. (Cl. 73—219)

The present invention relates to fluid metering systems and apparatus and is specifically concerned with metering systems and apparatus for accurately measuring liquid fuel consumption without interrupting the flow of the liquid fuel supplied to a point of usage.

Conventional fluid meters proposed in the past to obtain accurate measurements of liquid volume are unsatisfactory for certain applications such as, for example, the measurement of vehicle fuel consumption, at varying engine speeds since the required ranges of flow rates are not obtainable and means for providing the necessary precision and the checking of accuracy in operation have not been provided. Furthermore, prior art fuel-meters are incapable of maintaining the same degree of accuracy over wide ranges of flow rates and are prejudicially affected by normal variations in fuel pressure and temperature occurring in the operation of the engine or the like being supplied with fuel. While fuel meters satisfactory for laboratory studies of fuel consumption have recently been proposed, these devices have failed to respond consistently well when installed in vehicles operating under normal road conditions.

The present invention has for its principal object the provision of a fuel consumption metering system and apparatus for continuously and accurately metering the fuel supplied for use irrespective of variations in flow rates, fuel pressure and temperature of the supplied fuel under normal use conditions.

An additional important object of this invention resides in the provision of a metering apparatus which accurately measures the volume of a fluid flowing at varying rates of flow under normal operating conditions without interrupting the flow of fluid or rate of flow of the fluid being dispensed to a point of usage. As a result, the meter of this invention is especially useful in providing precise volumetric measurements under conditions where continuous flow of fluid is required such as in determining the quantity of fuel consumed at varying engine speeds in the operation of a motor vehicle engine.

More specifically, it is the object of this invention to provide a metering apparatus which is operative to count incremental volumes of flowing fluid consumed from a plurality of successively connected measuring chambers without interrupting the flow of fluid passing to the point of consumption.

Another more specific object of this invention is to provide a metering apparatus composed of a plurality of measuring chambers of fixed, predetermined volumes and a programming circuit for automatically filling and emptying the measuring chambers with fluid in such a manner as to maintain a continuous flow of fluid to and from the metering apparatus.

Still another more specific object of this invention is to provide a liquid metering apparatus having (1) a plurality of measuring chambers of fixed, predetermined volumes respectively connected to fluid inlet and fluid outlet passages for concomitant filling and emptying and (2) an automatic programming and control circuit for first connecting one measuring chamber to be filled from the fluid inlet passage while another of the measuring chambers is discharging fluid therefrom into the outlet passage, and then cyclically reversing the connections of the measuring chambers to the inlet and outlet passages so that fluid continuously flows into the outlet passage from one of the measuring chambers.

In conjunction with the foregoing object, it is a further object of this invention to provide each measuring chamber with a detecting device for sensing changes in the volume of liquid in its associated measuring chamber and for so programming the connection of the detection devices to a counter for registering volumetric changes from only a predetermined one of the measuring chambers at a time.

Further objects of this invention will appear as the description proceeds in connection with the appended claims and the annexed drawings wherein:

FIGURE 1 is a schematic view in elevation of a metering system and apparatus constructed according to a preferred embodiment of the present invention;

FIGURES 2 and 3 are circuit diagrams illustrating separate portions of the programming and counter read-out circuit shown in FIGURE 1;

FIGURE 4 is a section taken substantially along lines 4—4 of FIGURE 1 and illustrating details of the light source unit for the photocells shown therein;

FIGURE 5 is a fragmentary perspective view illustrating one embodiment of the stepper mechanism diagrammatically shown in FIGURE 2.

FIGURE 6 is a fragmentary perspective view of a switch actuating mechanism for controlling the actuation of the programming switches illustrated in FIGURES 2 and 3; and FIGURE 7 is a fragmentary schematic view illustrating a modified form of detecting apparatus for the metering system and apparatus shown in FIGURE 1.

Referring now to the drawings and more particularly to FIGURE 1, the reference numeral 10 generally designates a fluid meter embodying the principles of the present invention and especially constructed for measuring the volume of liquids. Meter 10 is shown to comprise a plurality of burettes 12, 13, and 14 which are mounted in upstanding, parallel relation on a suitable support panel (not shown) and which respectively define a plurality of volumetric measuring chambers 18, 19, and 20. Burettes 12, 13, and 14 advantageously are of conventional, graduated glass tube construction, and the volumes of measuring chambers 18, 19, and 20 are preferably equal.

With continued reference to FIGURE 1, burette 12 is formed with a bottom outlet port 20 and a side inlet port 22 disposed closely adjacent to port 20. The upper end of burette 12 is open and snugly receives a cork stopper 24 having a central through bore 26. A tube 28 extending in bore 26 is in fluid communication with measuring chamber 18 to provide an overflow outlet. The inside diameter of burette 12 above outlet port 20 is preferably uniform for a purpose that will presently become apparent.

Burettes 13 and 14 are preferably of the same construction as burette 12. Accordingly, like reference numerals have been employed to designate like parts except that the suffixes "a" and "b" have been added for respectively identifying components of burettes 13 and 14.

As shown in FIGURE 1, inlet ports 22, 22a, and 22b are connected in parallel to a fluid supply conduit 30 by conduits 32, 32a, and 32b respectively. Similarly, outlet ports 20, 20a, and 20b are connected in parallel to a fluid discharge conduit 34 by conduits 36, 36a, and 36b respectively. Solenoid operated valves 38, 38a, and 38b respectively disposed in conduits 32, 32a, and 32b control the flow of liquid from supply conduit 30 to measuring chambers 18, 19, and 20. To control the discharge of liquid from measuring chambers 18, 19, and 20 to conduit 34, solenoid operated valves 40, 40a, and 40b are respectively disposed in conduits 36, 36a, and 36b. Any suitable means, such as a pump 41 (FIGURE 1) disposed in conduit 30, may be employed to supply liquid to be metered to measuring chambers 18, 19, and 20. In this embodiment of the invention, the liquid to be metered is pumped into chambers 18, 19, and 20 and is allowed to flow out by gravity. Discharge of liquid from chambers 18, 19, and 20 may also be facilitated by placing a pump (not shown) in conduit 34.

With continued reference to FIGURE 1, operation of valves 38, 38a, and 38b are respectively controlled by solenoids 42, 42a, and 42b, and operation of valves 40, 40a, and 40b are respectively controlled by solenoids 44, 44a, 44b. Valves 38, 38a, 38b, 40, 40a, and 40b are normally closed and are opened by energizing solenoids 42, 42a, 42b, 44a, and 44b respectively.

As will be described in greater detail later on, a programming and counter read-out circuit 46 so controls the energization of solenoids 42, 42a, 42b, 44, 44a, and 44b as to cyclically fill and empty burettes 12, 13, and 14 in such a manner that liquid continuously flows through conduit 34 and the volume of the liquid transmitted from conduit 30 to conduit 34 is continually metered and registered.

With continued reference to FIGURE 1, a detecting apparatus 50 is operative to sense changes in the liquid level and, consequently, changes in the volume of liquid in measuring chamber 18 as burette 12 is cyclically filled and emptied. Circuit 46 is responsive to the sensing of the changes in the height of the liquid column by detecting apparatus 50 to control the operation of valves 38 and 40 and to actuate a totalizing register comprising an impulse counter 52 for recording the volume of liquid passed through measuring chamber 18.

In accordance with this invention, detecting apparatus 50 comprises a series of suitable, conventional photocells 60, 61, 62, 63, 64, 65, 66, 67, 68, 69, 70, 71, 72, 73, 74, 75, 76, 77, 78, 79, and 80 arranged in vertically apart, side-by-side parallel relation in a vertical row. Photocells 61–80 are mounted closely adjacent to one side of burette 12 and are spaced vertically by distances corresponding to equal volume graduations on burette 12. As shown, photocell 60 is at the top of the row adjacent to the upper end of burette 12, and photocells 61–80 are successively disposed one below the other with photocell 80 being disposed at the bottom of the row adjacent the lower end of burette 12.

Separate light source units 81 (FIGURE 1) are provided for each of the photocells 60–80 and are mounted on the side of burette 12 oposite from photocells 60–80. Each light source unit 81, as shown in FIGURE 4, comprises a socket mounted bulb 82 which, when illuminated, directs a light beam that passes through a focusing lens 83 and through burette 12 at right angles to the longitudinal axis thereof.

As shown in FIGURE 1, the light beams emitted by units 80 are so directed that they act upon the sensitive surfaces of respective ones of photocells 60–80 so that only one unit 81 is operative to change the conductivity of an associated one of photocells 60–80. Bulbs 82 are connected by suitable conductors to a pair of terminals 86 and 87 of a direct current source such as a 12 volt battery 88. A manual switch 89 and a variable resistor 90 are connected in series with bulbs 82. By closing switch 89, a circuit is completed to simultaneously illuminate all of the bulbs 82. Variable resistor 90 is selectively adjustable to vary the intensity of the light beams emitted by units 81.

With continued reference to FIGURE 1, an opaque cylindrical float 92 supported on top of a column of liquid in measuring chamber 18 is dimensioned to move freely up and down in burette 12 to block the light beams emitted by units 81 as the level of the liquid column changes. The axial length of float 92 is made sufficiently short as to permit float 92 to interrupt only one light beam at any position. When burette 12 is filled with liquid to be metered, float 92 is raised to a position where it blocks the light beam directed at photocell 60. Photocell 60, as will be explained in greater detail later on, is so connected in circuit 46 that when its light beam is interrupted, it energizes solenoid 42 to close valve 38 and thereby block flow of liquid into measuring chamber 18. When valve 40 is opened to drain measuring chamber 18, float 92 moves downwardly with the descending liquid column to successively interrupt the light beams directed at photocells 61–80.

Since photocells 61–80 are mutually spaced apart by distances corresponding to equal volume graduations on burette 12, the successive interruptions of the light beams by float 92 as it descends in burette 12 successively changes the conductivity of photocells 61–80 to provide a measure of equal incremental volumes of liquid discharged through outlet port 20. As will be described in greater detail later on, circuit 46 is responsive to the successive change in the conductivities of photocells 61–80 as a result of emptying burette 12 to actuate counter 52 for recording the liquid volume discharged from measuring chamber 18.

The number of photocells used in sensing the change in the liquid column level in burette 12 may be varied to increase or decrease the sensitivity of the metering apparatus. At least two photocells for each measuring chamber are required, however, to maintain a continuous flow of liquid through conduit 34 and to enable the continual actuation of counter 52 for totalizing the volume of liquid passing through the metering apparatus of this invention. These aspects of the invention will become more apparent as the description proceeds.

As shown in FIGURE 1, burettes 13 and 14 are also provided with detecting apparatus 94 and 96 which are of the same construction as detecting apparatus 50. Accordingly, like reference characters have been employed to designate like parts except that the suffix "a" has been added to identify the parts of detecting apparatus 94 and the suffix "b" has been added to identify the parts of detecting apparatus 96.

Advantageously, each of the burettes 12–14 together with their associated detecting apparatus 50, 94, and 96 may be enclosed in an unshown light tight casing to prevent stray light from objectionally triggering any of the photocells.

Referring now to FIGURE 2, circuit 46 is shown to comprise a multiple stage stepper switch mechanism 100 having three stages 102, 102a, and 102b operatively connected to detecting apparatus 50, 94, and 96 respectively. According to this embodiment, stage 102 is provided with a bank of twenty fixed contacts 103, 104, 105, 106, 107, 108, 109, 110, 111, 112, 113, 114, 115, 116, 117, 118, 119, 120, 121, and 122 which are respectively connected to corresponding terminals of photocells 61–80 by separate conductors generally indicated at 124. The other terminals of photocells 61–80 are connected by a common conductor 126 to terminal 86 of battery 88.

With continuing reference to FIGURE 2, a wiper 128 is stepped to successively engage contacts 103–122 by intermittently energizing a coil 130. Wiper 128 is connected in series with a programming switch 132 to one terminal of a resistor 134 in a typical amplifier 136. The other terminal of resistor 134 is connected to a screen grid 138 of a tetrode tube 140 in amplifier 136. The other terminal of resistor 134 is also connected to one terminal of a resistor 142 and also to a voltage divider 143 for resistor 142 in the manner shown. The other terminal of resistor 142 is connected to terminal 87 of battery 88 and to ground. With this circuitry it is apparent that photocells 61–80 are successively connected to the grid circuit of tetrode 140 by advancing wiper 128 to successively engage contacts 103–122.

As shown in FIGURE 2, the plate circuit for tube 140 contains a relay winding 144 which has its terminals respectively connected to the anode and to the control grid of tube 140. The control grid of tube 140 is connected by a conductor 145 to terminal 86 of battery 88. The cathode of tube 140 is connected to ground through a resistor 146. Circuit values constituting one embodiment of amplifier 136 are illustrated in FIGURE 2.

With the above described amplifying circuitry, it is clear that variation of photocell resistance connected by wiper 128 into the grid circuit for tube 140 results in a corresponding variation of voltage applied to grid 138 to render tube 140 conductive and non-conductive for respectively energizing and deenergizing relay winding 144. Interruption of the light beam directed at the one of photocells 61–80 which is connected by stepper mechanism 100 to the grid circuit tube 140 increases the grid circuit resistance to render tube 140 conductive for energizing relay winding 144. When the one of photocells 61–80 connected to the grid circuit of tube 140 is conducting, on the other hand, the voltage applied to grid 138 is such that it renders tube 140 non-conductive to de-energize winding 144.

As shown in FIGURE 2, energization of winding 144 closes a set of normally open contacts 150 having a pair of engageable contact elements 152 and 154. Contact element 152 is connected to ground, and contact element 154 is connected to one terminal of stepper coil 130. The other terminal of coil 130 is connected by a conductor 156 to terminal 86 of battery 88 in series with an overload fuse 158 and a manual switch 160. Counter 52 is connected in parallel circuit relation with stepper coil 130 and has one terminal connected by a conductor 162 to the terminal of coil 130 which is connected to conductor 156. The other terminal of counter 52 is connected through a manual switch 164 to contact element 154 by a conductor 166. Thus, by closing normally opened contacts 150, counter 52 is activated simultaneously with the energization of coil 130 when switches 160 and 164 are closed.

When burette 12 is filled with liquid to be metered, float 92 is raised to a position where it blocks the light beam directed at photocell 60, and wiper 128 is positioned to engage contact 103 which is connected to photocell 61. Photocell 61 is thus in a conductive state to render tube 140 non-conductive with the result that relay winding 144 is de-energized and contacts 150 are open for preventing actuation of counter 52 and energization of stepper coil 130.

When valve 40 is opened to allow the liquid in burette 12 to flow into conduit 34, float 92 moves downwardly with the descending liquid columns to successfully interrupt the light beams directed at photocells 61–80 as previously mentioned. The interruption of the light beam directed at photocell 61 renders tube 140 conductive for energizing relay winding 144 to close contacts 150. As a result, stepper coil 130 is energized through a circuit that may be traced from ground, through contacts 150, through coil 130, and through conductor 156 to terminal 86 of battery 88. Energization of coil 130 advances wiper 128 to contact 104 to thereby connect the next photocell 62 to the grid circuit of tube 140. Since the light beam directed at photocell 62 at this stage of the metering operation is uninterrupted, photocell 62 is still conductive to render tube 140 non-conductive. As a consequence, relay winding 144 is de-energized, permitting contacts 150 to open for de-energizing coil 130 and thus arresting the advancement of wiper 128 at contact 104.

From the foregoing description it is clear that stepper coil 130 is pulsed to advance wiper 128 to the next contact in stage 102 when the liquid column in burette 12 has descended sufficiently to move float 92 downwardly to a position where it interrupts the light beam directed at photocell 61. Simultaneously with the pulsing of stepper coil 130 to advance wiper 128, counter 52 is actuated to record the advancement of float 92 from photocell 60 to photocell 61.

As a liquid continues to flow out of burette 12, float 92 descends to block the light beam directed at photocell 62 which, at this stage of the operation, is connected by wiper 128 to the grid circuit of tube 140. By blocking the light beam directed at photocell 62, the increased resistance in the grid circuit for tube 140 again renders tube 140 conductive to energize relay winding 144. Thus, contacts 150 are again closed to actuate counter 52 and to energize stepper coil 130 to advance wiper 128 to the next contact 105 in stage 102. Since contact 105 is connected to photocell 63 which is still conductive, tube 140 becomes non-conductive to de-energize relay winding 144 for opening contacts 150 and thereby de-energizing coil 130 and deactivating counter 52 in the manner already explained.

From the foregoing it is apparent each light beam interruption by float 92 pulses relay winding 144 through amplifier 136 to actuate counter 52 for counting in the number of interruptions. In addition to actuating counter 52, each interruption of a light beam by float 92 as it moves downwardly with the descending liquid column pulses stepper coil 130 through the opening and closing of normally open contacts 150 to advance wiper 128.

Since photocells 61–80 are spaced vertically apart by distances corresponding to equal volume graduations on burette 12, the number of light beam interruptions indicated by counter 52 constitutes an instantaneous, totalized measure of the volume discharge from burette 12. In the present embodiment, burette 12 has a capacity of 100 milliliters and photocells 61–80 are spaced vertically apart by distances corresponding to 5 cc. on the burette graduations. Accordingly, counter 52 will register twenty counts when burette 12 is emptied.

As shown in FIGURE 2, the construction and circuit connections of stages 102a and 102b of stepper switch mechanism 100 are of the same as that just described for stage 102. Accordingly, like reference numerals have been employed to designate like components except that the suffix "a" has been added to identify the components for stage 102a and the suffix "b" has been added to designate the components for stage 102b.

According to this invention, wipers 128, 128a, and 128b are respectively connected in series with switches 132, 132a, and 132b to the same terminal of resistor 134 in amplifier 136. With this circuitry, parallel current paths may be established through stages 102, 102a, and 102b and their associated banks of photocells 61–80, 61a–80a, and 61b–80b and switches 132, 132a, and 132b for energizing relay winding 144. Switches 132, 132a, and 132b, as will be explained shortly, are so actuated in coordination with the operation of valves 40, 40a, and 40b that only the stepper switch stage associated with the burette being emptied is connected to amplifier 136.

To program the actuation of valves 40, 40a, and 40b and switches 132, 132a, and 132b, stepper switch mechanism 100, as shown in FIGURE 2, is provided with a fourth stage 170 having a bank 172 of twenty fixed contacts which are successively engageable by a wiper 174. Wiper 174 is connected to conductor 156 in series with switch 160 and fuse 158, and the last contact in bank 172 corresponding to contacts 122, 122a, and 122b and indicated at 175 is connected by a conductor 178 to one terminal a programming coil 180 (FIGURE 3). The other terminal of coil 180 is connected by a conductor 182 (FIGURES 2 and 3) to terminal 87 of battery 88.

Stepper switch mechanism 100 is of the type that advances wipers 128, 128a, 128b, and 174 in unison to simultaneously engage corresponding contacts in stages 102, 102a, 102b and 170 respectively. A typical construction of stepper switch mechanism is shown in FIGURE 5 to comprise a shaft 184 which mounts wipers 128, 128a, 128b, and 174 and which is rotated in a predetermined direction by a pawl and ratchet wheel assembly 186. The pawl of assembly 186 comprises armature which is attracted by energization of coil 130 to advance wipers 128, 128a, 128b, and 174.

When wiper 174 is advanced to engage the contact 175 in bank 172, a circuit is completed for energizing coil 180. This circuit may be traced from battery terminal 87 through conductor 182, through coil 180, through conductor 178, through fuse 158, and through switch 160 to battery terminal 86. Continued advancement of wiper 174 past contact 175 as a result of pulsing coil 130, interrupts the energizing circuit for coil 180 to thus pulse coil 180 for a purpose now to be described.

Referring now to FIGURE 6, energization of coil 180 rotates a shaft 190 through a suitable pawl and ratchet wheel assembly 192 of a switch actuating mechanism 194. Mechanism 194 may be of any suitable, conventional construction and is shown to typically comprise a suitable contoured cam assembly 196 mounted on shaft 190 and engaging a series of actuators 198, 198a, and 198b which are respectively connected to switches 132, 132a, and 132b, to drain valve programming switches 200, 200a, and 200b, and to re-fill valve programming switches 202, 202a, and 202b.

As shown in FIGURE 3, switches 200, 200a, and 200b, are respectively connected to corresponding terminals of solenoids 44, 44a, and 44b and to one terminal of a fuse 204 which is connected in series with a manual switch 205 to terminal 86 of battery 88 by means of a conductor 206. The other terminals of solenoids 44, 44a, and 44b are connected by conductor 182 to terminal 87 of battery 88. Thus, it clears that solenoids 44, 44a, and 44b are in series with switches 200, 200a, and 200b respectively and are connected in parallel across terminal 86 and 87 of battery 88.

Solenoids 42, 42a, and 42b, as shown in FIGURE 3, have corresponding terminals connected to battery terminal 86 in series with fuse 204 and switch 205. The other terminals of solenoids 42, 42a, and 42b are respectively connected in series with switches 202, 202a, and 202b which, in turn, are connected to ground through separately actuatable sets of normally closed relay contacts 210, 210a, and 210b respectively. As will be explained in greater detail later on, contacts 210, 210a, and 210b are opened to respectively interrupt the energizing circuits for solenoids 42, 42a, and 42b when floats 92, 92a, and 92b interrupt the light beams respectively directed at photocells 60, 60a, and 60b.

By pulsing coil 180, cam assembly 196 is rotated through three successive operating positions in making one revolution. In its first operating position, cam assembly 196 permits wsitches 132, 200, and 202b to close and holds switches 132a, 132b, 200a, 200b, 202, and 202a to open. The next pulse of coil 180 rotates cam assembly 196 to a position where it permits switches 132a, 200a, and 202 to close, open switches 132, 200, and 202b, and holds switches 132b, 200b, and 202a open. The third pulse of coil 180 rotates cam assembly 196 to permit switches 132b, 200b, and 202a to close, to open switches 132a, 200a, and 202, and holds witches 132, 200, and 202b open.

With continued reference to FIGURE 3, contacts 210 are opened by energizing a relay 212 which is connected in a plate circuit 214 of a tetrode tube 216 in the same manner as winding 144 is connected in the plate circuit of tetrode tube 140. Tetrode tube 216 forms a part of an amplifier 220 which is the same as amplifier 136 and which has a grid circuit 222 connected by a conductor 224 to one terminal of photocell 60, the other terminal of photocell 60 being connected to battery terminal 86 as previously described.

In a similar manner described with respect to the operation of amplifier 136, the variation in the resistance of photocell 60 by blocking and unblocking the photocell light beam with float 92 renders tetrode tube 216 conductive and non-conductive to respectively energize and de-energize relay 212.

The relay and amplifier circuitry for actuative contacts 210a and 210b is the same as that just described for contacts 210. Accordingly, like reference numerals have been used to identify like components except that the suffix *a* has been employed to designate the amplifier and relay components for contacts 210a and the suffix *b* has been employed to designate the amplifier and relay components for contacts 210b.

To start operation of the metering apparatus of this invention, switches 89, 89a, 89b, 160, and 205 are closed. A valve 229 disposed in conduit 34 is closed to prime the system in the event burettes 12–14 are empty. A suitable spring loaded pushbutton 230 (FIGURE 3) is then depressed by the operator to selectively energize coil 180 through a circuit that may be traced from terminal 86 of battery 88, through conductor 206, through switches 205 and 230, through coil 180, and through conductor 182 to terminal 87 of battery 88. Pushbutton 230 is released to deenergize coil 180 when cam assembly 196 is rotated to one of its three previously described switch actuating positions. For explaining the operation of the metering apparatus, let it be assumed that burettes 12–14 are empty, valve 229 is closed, and cam assembly 196 is positioned to close switches 132, 200, and 202b and open switches 132a, 132b, 200a, 200b, 202, and 202a. Under these conditions, fluid will be furnished to burette 14, and burette 14 will become filled when float 92b interrupts the light beam to photocell 60b thus opening switch 210b which in turn closes valve 38b through solenoid 42b. After burette 14 has been filled, pushbutton 230 is again depressed and released to energize and deenergize coil 180, and cam assembly 196 is rotated to the second of its three previous described switch actuating positions. Under these conditions, burette 12 will be filled in the same manner as described for burette 14. After burette 12 has been filled and valve 38 is closed by de-energizing solenoid 42 by switch 210 opening, pushbutton 230 is depressed and released to energize and de-energize coil 180, and cam assembly 196 is rotated to the third of its three previously described switch actuating positions. Under these circumstances, burette 13 will be filled in the same manner as described for burette 14. Pushbutton 230 may be depressed and released in order to allow burette 12 to be drained first, although the draining process may begin in any one of the burettes. The meter is now prepared to meter fluid that will pass from burette 12 through conduit 34 when valve 229 is opened. As will become apparent shortly, these conditions preparatory to starting a metering operation may already be present if the metering apparatus was previously used.

With components of the metering apparatus conditioned as described above, switch 164 is closed and valve 229 is opened. As a result of closing switch 200, solenoid 44 is energized when switch 205 is closed to open valve 40, thereby allowing liquid in burette 12 to flow into conduit 34. By holding switches 200a, 200b, 202, and 202a open with cam assembly 196, energization of solenoids 44a, 44b, 42, and 42a is prevented to keep valves 40a, 40b, 38, and 38a closed. As a result, flow of liquid into burette 12 is prevented, flow of liquid out of burette 14 is blocked, and flow of liquid into and out of burette 13 is blocked. Although switch 202b is closed at this stage, solenoid 42b is not energized to open valve 38b since float 92b is blocking the light beam to photocell 60b as a result of having previously filled burette 14.

As the liquid flows out of burette 12, float 92 moves downwardly from its upper position to successively block the light beams directed at photocells 61–80. By closing switch 132, wiper 128 is connected to the grid circuit of amplifier 136 so that each light beam interrupted by float 92 as it descends pulses stepper coil 130 and actuates counter 52 to count in the number of light beam interruptions in the manner previously described.

When the liquid column in burette 12 has descended sufficiently to allow float 92 to block the light beam directed at photocell 79, wipers 128, 128a, 128b, and 174 will be advanced to respectively engage contacts 122, 122a, 122b, and 175. By engaging contact 175 with wiper 174 a circuit is completed to energize coil 180 which prepares cam assembly 196 to be rotated to its next operating position. Interruption of the last light beam directed at photocell 80 disengages contact 175 with wiper 174, de-energizes coil 180 which rotates cam assembly 196 to its next operating position where switches 132, 200 and 202b are allowed to open, switches 132a, 200a and 202 are closed and switches 132b, 200b, and 202a are held open. Advancement of wiper 174 to this position thus de-energizes coil 180 to prevent further rotation of cam assembly 196. Interruption of the last light beam directed at photocell 80 at the same time advances wipers 128, 128a, 128b and 174 respectively to contacts 103, 103a, 103b and the first contact in bank 172.

By closing switch 202 and opening switch 200, solenoids 42 and 44 are respectively energized and de-energized to close outlet valve 40 and open inlet valve 38. As a result further flow of liquid out of burette 12 is blocked and liquid from conduit 30 is allowed to flow into measuring chamber 18 to refill burette 12. Closing of switch 200a energizes solenoid 44a to open outlet valve outlet 40a and thereby allow the liquid in burette 13 to flow into conduit 34. Since valves 40 and 40a are respectively closed and opened simultaneously, it will be appreciated that flow of liquid through conduit 34 is not interrupted.

As soon as valve 40a is opened, float 92a begins to move downwardly with the descending liquid column for successively blocking the light beams directed at photocells 61a–80a for pulsing coil 130 and actuating counter 52 through switch 132a which is now closed.

At the same time burette 13 is being emptied, burette 12 is being filled through valve 38 which was opened as a reuslt of energizing solenoid 42 by closing switch 202. Since switch 132 is open, continuity of the circuit through photocells 61–80 and wiper 128 is interrupted to thereby prevent the light beam interruptions made by float 92 as it ascends from actuating counter 52 or energizing stepper coil 130. When burette 12 is filled, float 92 blocks the light beam directed at photocell 60 to cause winding 212 to be energized. As a result, contacts 210 open to interrupt the energizing circuit for solenoid 42, thereby closing inlet valve 38. With switches 200b and 202b open while burette 13 is being emptied and burette 12 is being refilled, solenoids 42b and 44b are de-energized to hold valves 38b and 40b closed. Accordingly, flow of liquid into and out of burette 14 is blocked.

When float 92a has descended sufficiently far to advance wiper 174 to engage contact 175, a circuit again is completed to energize coil 180 for advancing cam assembly 196 to its third operating position where it opens switches 132a, 200a, and 202, closes switches 132b, 200b, and 202a, and holds switches 132, 200, and 202b open. By opening switch 200a and closing switch 200b, solenoid 44a is de-energized and solenoid 44b is energized to respectively close and open outlet valves 40a and 40b simultaneous. As a result, liquid in burette 14 is now allowed to flow into conduit 34, and by closing switch 200a to open inlet valve 38a through the energization of solenoid 42a, liquid from conduit 30 refills burette 13. Inlet valve 38a is closed when burette 13 is filled to raise float 92a to block the light beam directed at photocell 60a as previously described. Since switch 132a is open, continuity of the circuit through photocells 61a–80a and wiper 128a is interrupted to prevent the light beam interruptions made by float 92a as it ascends from actuating counter 52 or energizing stepper coil 130.

Closing of switch 132b connects wiper 128b to the grid circuit of amplifier 136 to count in the number of light beams interrupted by float 92b as it moves downwardly with the descending liquid column and to pulse stepper coil 130 for advancing wipers 128, 128a, 128b, and 174. When wiper 174 is advanced to engage contact 175, coil 180 is again energized and de-energized to advance cam 196 to its first operating position for repeating the filling and emptying operations of burettes 14 and 12 respectively.

From the foregoing description, it will be appreciated that a continuous flow of liquid is maintained in conduit 34 and the volume of liquid entering conduit 34 from burettes 12–14 is continually registered by counter 52. Accordingly, the apparatus of this invention is especially useful for metering the volume of fuel consumption in a motor vehicle or in other applications where continuous fluid flow is required and where precise volumetric measurements are desired regardless of fluid flow rate variations. In connecting the metering apparatus of this invention for measuring the quantity of fuel consumed in a motor vehicle, pump 41 may be omitted, and conduits 30 and 34 may be respectively connected to the fuel pump outlet and the carburetor inlet. It is also evident from the foregoing description that the flow of the liquid being metered may be stopped at any time and counter 52 will provide a read-out of the liquid volume which has passed through the metering apparatus.

In FIGURE 7, a modified detecting apparatus for sensing the changes of liquid volume in measuring chamber 18 is shown to comprise a bank 239 of suitable, magnetically actuatable, transducers 240 arranged in a vertical row in place of photocells 60–80. One specific form of transducer that may be used in this invention is the Model 3015A Magnetic Pick-up, manufactured by Electro Products Laboratories, Inc. A metallic float 242 supported on top of the liquid column in burette 12 in place of float 92 is vertically movable as the liquid descends and ascends to successively actuate transducers 240 in a manner similar to the operation of the photocells 60–80. The terminals of the transducers 240 are connected to stage 102 of stepper mechanism 100 in the same manner described for photocells 60–80 in the embodiment of FIGURES 1–6. Photocells 60a–80a and 60b–80b together with floats 92 and 92a for burettes 13 and 14 are also replaced in this modified embodiment with magnetically actuatable transducers in the same manner as described for burette 12.

In operation of the detecting apparatus shown in FIGURE 7, metallic float 242 is raised to its upper position where it actuates transducer 240 in bank 239 when chamber 18 is filled with liquid to be measured, thus leaving the remaining transducers in bank 239 unactuated. With burette 12 filled, wiper 128 connects the second transducer from the top in bank 239 to interrupt the grid circuit for tube 140. As a result, tube 140 is conductive to pulse counter 52 and to advance wiper 128 to contact 104 in the manner described for the photocell embodiment of FIGURES 1–6. Since the third transducer from the top in bank 239 is still closed, the advance of wiper 128 to contact 104 applies a voltage to grid 138 of tube 140 to again render tube 140 non-conductive for arresting advancement of wiper 128 and removing the actuating pulse from counter 52. Thus, the successive actuation of transducers 240 by float 242 as it moves downwardly with the descending liquid column in burette 12 advances wiper 128 and pulses counter 52 in the manner corresponding to the operation of photocells 60–80.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a liquid metering apparatus having a fluid inlet passage and a fluid outlet passage, means providing a plurality of measuring chambers of fixed, predetermined volumes, valve means actuatable to connect said measuring chambers to said inlet and outlet passages for cyclically filling and emptying said measuring chambers, detecting means for sensing changes in the level of liquid in each of said chambers, and means responsive to the sensing of predetermined liquid level changes by said detecting means for successively connecting said measuring chambers to discharge liquid therein into said outlet passage and for successively connecting said measuring chambers to said inlet passage to be filled with liquid therefrom during the intervals said chambers are disconnected from said outlet passage, said detecting means for each of said measuring chambers comprising a series of photocells disposed at different predetermined liquid levels, means providing a series of light beams directed one at each of said photocells, an element supported by and movable with the liquid in each measuring chamber for successively blocking said light beams to change the conductivity of said photocells and means actuated by said change of photocell conductivity for totalizing the number of light beam interruptions made by said element as the liquid in the associated measuring chamber is being discharged through said fluid outlet passage.

2. In a liquid metering apparatus having an inlet passage and an outlet passage, means providing a plurality of measuring chambers of fixed, predetermined volumes, valve means actuatable to separately connect each of said measuring chambers to said inlet passage and to said outlet passage for respectively filling and emptying each measuring chamber, a series of photocells associated with each of said measuring chambers and being disposed at different predetermined liquid levels, means providing light beams directed one at each of said photocells, a float supported by and movable with the liquid in each measuring chamber for successively blocking said light beams to change the conductivity of said photocells as the liquid level is increased or decreased, programming means responsive to a change in conductivity of a predetermined one of the photocells associated with each measuring chamber for so actuating said valve means as to successively connect said measuring chambers to discharge liquid into said outlet passage and to successively connect said measuring chambers to be filled with liquid from said inlet passage during the intervals when said measuring chambers are disconnected from said outlet passage, and counter means actuated by said change in conductivity of the photocells associated with each measuring chamber for totalizing the number of light beam interruptions made by said float as the liquid in each measuring chamber is being discharged into said outlet passage.

3. The liquid metering apparatus defined in claim 2 wherein said programming means is operative to connect said counter means to be actuated only by the series of photocells associated with the one of said measuring chambers from which liquid is being discharged.

4. The liquid metering apparatus defined in claim 3 wherein said programming means comprises a stepper switch mechanism having a stepper coil and a plurality of stages associated one with each of said measuring chambers and including a bank of fixed contacts successively engageable by a wiper movable in response to pulsing said coil, a source of operating voltage, means connecting corresponding terminals of said photocells to said source of operating voltage, means connecting the other terminals of each series of photocells to said contacts in the stage associated therewith, and means operatively connected to each wiper and to said source of operating voltage for responding to a change in conductivity of the photocell connected to said wiper through said contacts for pulsing said coil and actuating said counter means.

5. The liquid metering apparatus defined in claim 4 wherein said means operatively connected to each wiper comprises electronic amplifier means having a load circuit and a control circuit, switch means actuated by said programming means for separately connecting each wiper to said control circuit, said control circuit being conditioned by changing the conductivity of the photocell connected thereto to energize said load circuit, and contact means actuatable by energization of said load circuit for controlling energization of said coil and actuation of said counter.

6. The liquid metering apparatus defined in claim 3 comprising means responsive to a change in conductivity of a further predetermined one of said photocells associated with each measuring chamber for actuating said valve means to block flow of liquid from said inlet passage.

7. The liquid metering apparatus defined in claim 2 wherein said means providing each of said measuring chambers comprises a receptacle having transparent wall surfaces, and wherein said photocells and said means providing said light beams are respectively disposed on opposite sides of said receptacle with said light beams passing through said transparent wall surface at right angles to direction of the movement of liquid entering and discharging with respect to each associated measuring chamber.

8. The liquid metering apparatus defined in claim 7 wherein each of said receptacles comprises a uniformly diametered tubular portion delimiting each of said measuring chambers and wherein said series of photocells are arranged in an upstanding row along one side of said tubular portion and are spaced vertically apart by equal distances.

References Cited
UNITED STATES PATENTS

| | | | |
|---|---|---|---|
| 2,490,627 | 12/1949 | Hofberg | 73—223 X |
| 2,876,641 | 3/1959 | Brown | 73—221 |
| 2,964,944 | 12/1960 | Kuntz | 73—219 |
| 3,107,818 | 10/1963 | Carmellini et al. | 73—432 X |
| 3,154,946 | 11/1964 | Ordorica et al. | 73—313 |

FOREIGN PATENTS

| | | |
|---|---|---|
| 821,061 | 9/1959 | Great Britain. |
| 1,228,173 | 3/1960 | France. |

RICHARD C. QUEISSER, *Primary Examiner.*

E. D. GILHOOLY, *Examiner.*